(12) United States Patent
Douglas

(10) Patent No.: US 11,856,121 B2
(45) Date of Patent: Dec. 26, 2023

(54) MULTI-FUNCTIONAL ELECTRONIC DEVICE ACCESSORY

(71) Applicant: Samuel Douglas, Stafford, VA (US)

(72) Inventor: Samuel Douglas, Stafford, VA (US)

( * ) Notice: Subject to any disclaimer, the term of this patent is extended or adjusted under 35 U.S.C. 154(b) by 382 days.

(21) Appl. No.: 17/340,790

(22) Filed: Jun. 7, 2021

(65) Prior Publication Data
US 2021/0385316 A1  Dec. 9, 2021

Related U.S. Application Data

(60) Provisional application No. 63/035,751, filed on Jun. 6, 2020.

(51) Int. Cl.
| | | |
|---|---|---|
| *H04M 1/04* | (2006.01) | |
| *F16M 11/10* | (2006.01) | |
| *H04B 1/3877* | (2015.01) | |

(52) U.S. Cl.
CPC ............ *H04M 1/04* (2013.01); *F16M 11/105* (2013.01); *H04B 1/3877* (2013.01)

(58) Field of Classification Search
CPC ..... H04M 1/04; F16M 11/105; F16M 11/041; F16M 11/10; F16M 11/2028; F16M 13/04; H04B 1/3877
USPC ...................................................... 455/575.1
See application file for complete search history.

(56) References Cited

U.S. PATENT DOCUMENTS

| | | | |
|---|---|---|---|
| D644,428 S | 9/2011 | Fen | |
| 9,267,638 B2 | 2/2016 | Le Gette et al. | |
| 10,371,196 B1 * | 8/2019 | Zaloom | ................. F16M 11/38 |
| 2008/0314941 A1 * | 12/2008 | Knych | .................... H04B 1/385 |
| | | | 224/191 |
| 2012/0025039 A1 | 2/2012 | Segal | |
| 2018/0167498 A1 * | 6/2018 | Drakos | .............. F16M 11/2021 |

FOREIGN PATENT DOCUMENTS

| | | | | |
|---|---|---|---|---|
| CN | 2759075 Y | | 2/2006 | |
| CN | 103016929 B | | 5/2015 | |
| EP | 1938710 A1 * | | 7/2008 | ............. A45C 11/00 |

OTHER PUBLICATIONS

Amazon.com, "Flygrip Gravity—Carbon Fiber—High Performance Smartphone Accessory/Kickstand—Large Size," https://www.amazon.com/exec/obidos/ASIN/B01MDNM5UJ/ezvid02-20 [Date accessed: Jan. 23, 2020].
AliExpress.com, "Flower Sucker Cell Phone Stand 360 Degree Rotatable Magic Suction Cup Car Mobile Phone Holder Bracket Mount 5 Color Option," https://www.aliexpress.com/item/1005001676594716.html?spm=a2g0o.productlist.0.0.381f7ae539zSjD&algo_pvid=2ecdd2ba-d1e7-45ca-8c75-102e4477cb8c&algo_expid=2ecdd2ba-d1e7-45ca-8c75-102e4477cb8c-0&btsid=0bb0624116227892095445369e0261&ws_ab_test=searchweb0_0,searchweb201602_,searchweb201603_[Date accessed: Jan. 23, 2020].

* cited by examiner

*Primary Examiner* — Eugene Yun
(74) *Attorney, Agent, or Firm* — Bold IP, PLLC

(57) ABSTRACT

A mobile device accessory assembly for holding and using a mobile device is provided. The assembly includes an attachment base for attaching the accessory assembly to a surface of the mobile device, and a multi-positional stand member extendable to hold the mobile device in a variety of upright orientations. A pivot assembly couples the stand member to the attachment base while providing the stand member two distinct degrees of freedom with respect to the attachment base. A clip member is coupled to the stand member providing an attachment mechanism to secure the accessory assembly and the mobile device held thereby to a separate structure.

20 Claims, 12 Drawing Sheets

FIG. 3A
FIG. 3B
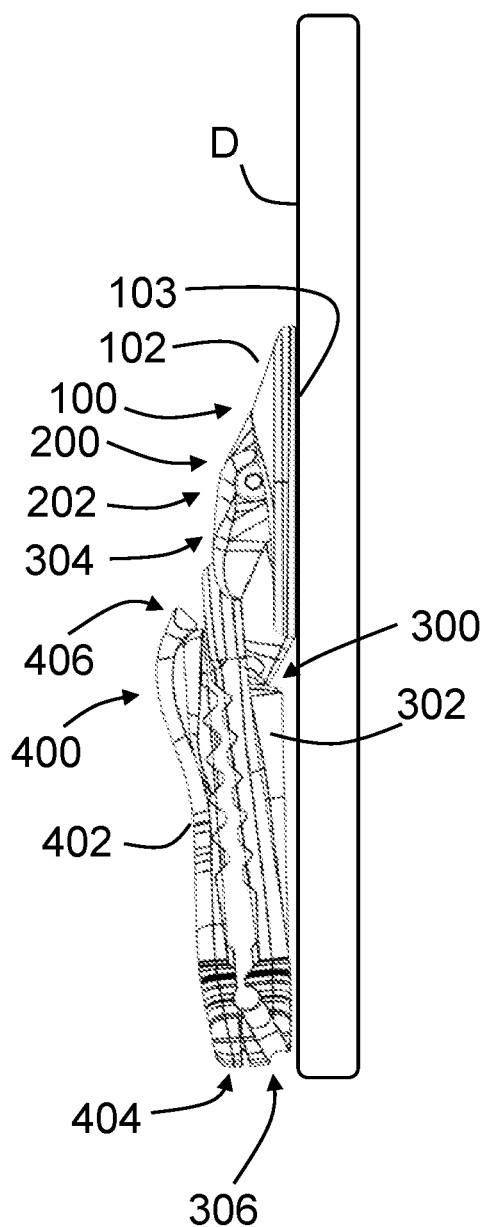
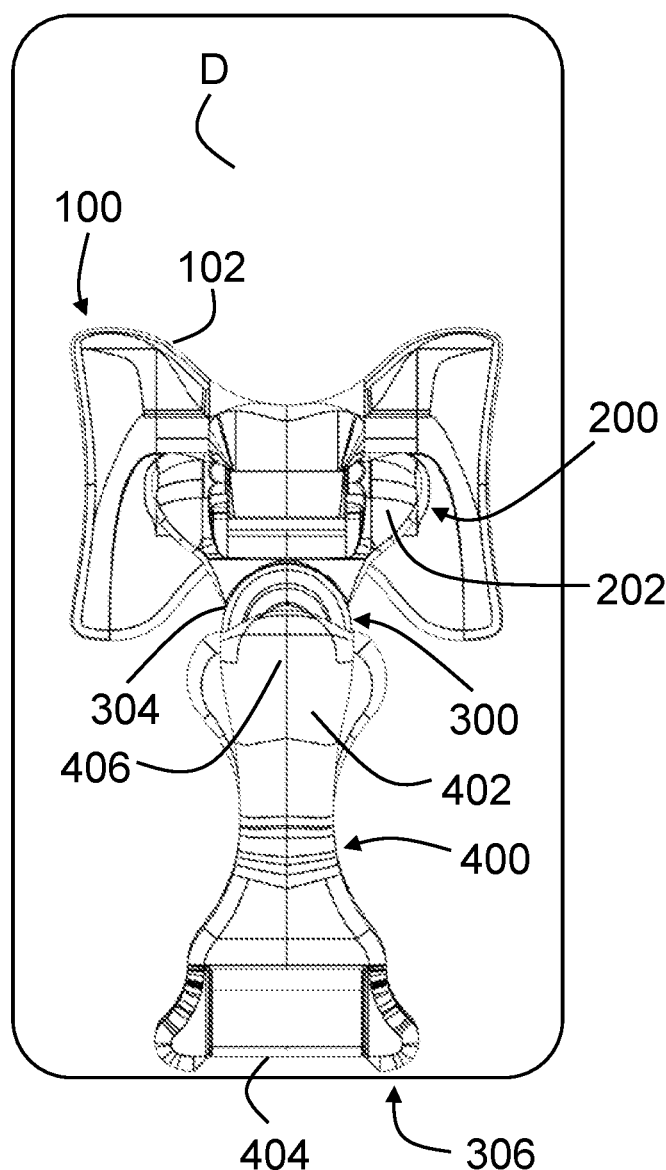

MULTI-FUNCTIONAL ELECTRONIC DEVICE ACCESSORY

CROSS-REFERENCE TO RELATED APPLICATIONS

This application claims priority to U.S. Provisional Application No. 63/035,751 filed Jun. 6, 2020, the entire contents of which are hereby fully incorporated herein by reference for all purposes.

FIELD OF THE INVENTION

This invention relates to mobile device accessories, including a mobile device accessory that provides a handle, a grip, a stand, and a clip to a mobile device.

BACKGROUND

There are currently several types of accessory devices designed to hold and/or store mobile phones in desired positions. Such devices include, for example, mobile phone stands for holding mobile phones upright on a surface for viewing, holsters that attach to a pocket or belt for holding a mobile phone, clips that enable a mobile a cell phone to be carried/attached to a pocket or belt, grips that attach to the back of a mobile phone, and so forth. These types of devices can be configured to attach directly to the back of a mobile phone, attach to the back of a mobile phone case, be integrated into a mobile phone case, and so on.

Mobile phone stands are typically designed to hold a mobile phone upright in a single predetermined position. However, these devices oftentimes limit a phone's placement and the angle at which it can be viewed. Moreover, typical standing cases do not afford portability of the mobile phone and cannot be used as a grip for holding a mobile phone in the user's hand when in use or transport.

Mobile phone holsters are commonly used for holding a phone on a belt, a pocket, and so forth. While providing a convenient manner of holding a mobile phone on a person, such holsters are typically limited in functionality and do not provide a grip and/or a stand for a mobile phone.

Another type of mobile phone accessory device is a grip that also provides for a stand that can be slightly adjustable to help provide an optical viewing angle. One such device is a generic ring type phone stand in which a ring can rotate out from the back of a mobile phone to provide a grip and/or a stand. Another such device is an extendable circular grip that can also function as a stand. These devices typically do not provide a secure clip for holding a phone in one's pocket, on a pocket or belt, and so on.

Accordingly, there is a need for a mobile phone accessory device that may be easily coupled to a mobile phone to provide a grip, a stand that can hold the phone at multiple angles, and a secure clip for easy attachment and retrieval of the mobile phone. The presently disclosed mobile phone accessory addresses these needs.

SUMMARY

According to one aspect, one or more embodiments are provided below for a mobile device accessory comprising a pivot base including a first arm and a second arm defining a gap therebetween, a first set of detents configured with the first arm, a second set of detents configured with the second arm, and a third set of detents configured opposite the first and second arms, the first and second sets of detents opposing one another within the gap, an attachment base including a mount rotatably coupled to the pivot base within the gap, the attachment base including a first ball bearing adapted to engage at least one detent of the first set of detents, and a second ball bearing adapted to engage at least one detent of the second set of detents, a stand member with a proximal end and a distal end, the distal end rotatably coupled to the pivot base and including a third ball bearing adapted to engage at least one detent of the third set of detents, and a clip member with a proximal end and a distal end, the proximal end coupled with the distal end of the stand member, wherein the attachment base is adapted to rotate with respect to the pivot base in a first direction, and the stand member is adapted to rotate with respect to the pivot base in a second direction distinct from the first direction.

In another embodiment, the attachment base includes an attachment surface adapted to be connected to a surface of a mobile device.

In another embodiment, the first direction is along a first axis and the second direction is along a second axis, the first and second axis perpendicular with one another.

In another embodiment, the engagement of the first ball bearing with at least one detent of the first set of detents and the engagement of the second ball bearing with at least one detent of the second set of detents releasably holds the attachment base at a first angle with respect to the pivot base.

In another embodiment, the first angle is selected from the group of −5°, 45°, 90°, and 135°.

In another embodiment, the engagement of the third ball bearing with at least one detent of the third set of detents releasably holds the stand member at a second angle with respect to the pivot base.

In another embodiment, the second angle is selected from the group of 0°, 22.5° to the left of 0°, 45° to the left of 0°, 22.5° to the right of 0°, and 45° to the right of 0°.

In another embodiment, the first arm includes a first peg hole, the second arm includes a second peg hole, and the mount includes a third peg hole, and wherein the first, second and third peg holes are aligned to form a pivot point about which the attachment base rotates with respect to the pivot base.

In another embodiment, the distal end of the stand member includes a first peg hole, and the pivot base includes a second peg hole, and wherein the first and second peg holes are aligned to form a pivot point about which the stand member rotates with respect to the pivot base.

In another embodiment, the proximal end of the clip member is coupled to the distal end of the stand member with a spring member.

In another embodiment, the first ball bearing and the second ball bearing are each spring loaded from within the attachment base.

In another embodiment, the third ball bearing is spring loaded from within the stand member.

In another embodiment, the mobile device assembly further comprises an O-ring channel configured with the distal end of the stand member and adapted to hold an O-ring, at least a portion of the O-ring exposed to provide traction between the distal end of the stand member and a surface upon which the stand member engages.

According to another aspect, one or more embodiments are provided below for a mobile device accessory comprising a pivot base including a first coupling peg and a second coupling peg, a first set of detents concentrically positioned about the first coupling peg, and a second set of detents concentrically positioned about the second coupling peg, an attachment base including an attachment surface adapted to be connected to a surface of a mobile device, a mount rotatably coupled to the first coupling peg, and a first ball bearing adapted to engage at least one detent of the first set of detents, a stand member with a proximal end and a distal end, the proximal end rotatably coupled to the second coupling peg and including a second ball bearing adapted to engage at least one detent of the second set of detents, and a clip member with a proximal end and a distal end, the proximal end coupled with the distal end of the stand member, wherein the attachment base is adapted to rotate with respect to the pivot base in a first direction, and the stand member is adapted to rotate with respect to the pivot base in a second direction distinct from the first direction.

In another embodiment, the first direction is along a first axis and the second direction is along a second axis, the first and second axis perpendicular with one another.

In another embodiment, the engagement of the first ball bearing with at least one detent of the first set of detents releasably holds the attachment base at a first angle with respect to the pivot base.

In another embodiment, the engagement of the second ball bearing with at least one detent of the second set of detents releasably holds the stand member at a second angle with respect to the pivot base.

In another embodiment, the first coupling peg is perpendicular to the second coupling peg.

In another embodiment, the pivot base includes a third coupling peg and a third set of detents concentrically positioned about the third coupling peg, and the attachment base includes a third ball bearing adapted to engage at least one detent of the third set of detents.

In another embodiment, the first ball bearing is spring loaded from within the attachment base and the second ball bearing is spring loaded from within the stand member.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 3A-3B show an electronic device accessory assembly configured with a mobile device according to exemplary embodiments hereof;

DETAILED DESCRIPTION OF EXEMPLARY EMBODIMENTS

In general, and according to exemplary embodiments hereof, a multi-functional accessory assembly for electronic devices is provided. In some embodiments, the accessory is attached to a surface of a mobile device (e.g., a smartphone) or a mobile device cover (e.g., a phone case) to provide the functionalities of a handle, a grip, a stand, and a clip.

As described herein, the accessory assembly includes an attachment base that attaches to the back of a mobile device or mobile device case, a stand and clip portion that may extend/rotate outward from the attachment base to provide a stand and/or a grip, and a clip configured with the stand to provide attachment of the mobile device to a pocket, belt, or similar article to which the phone might be inserted or attached for carrying and holding when not in use. In some embodiments, the stand functionality is multi-positional with two degrees of freedom as will be described in other sections.

Figure 1:
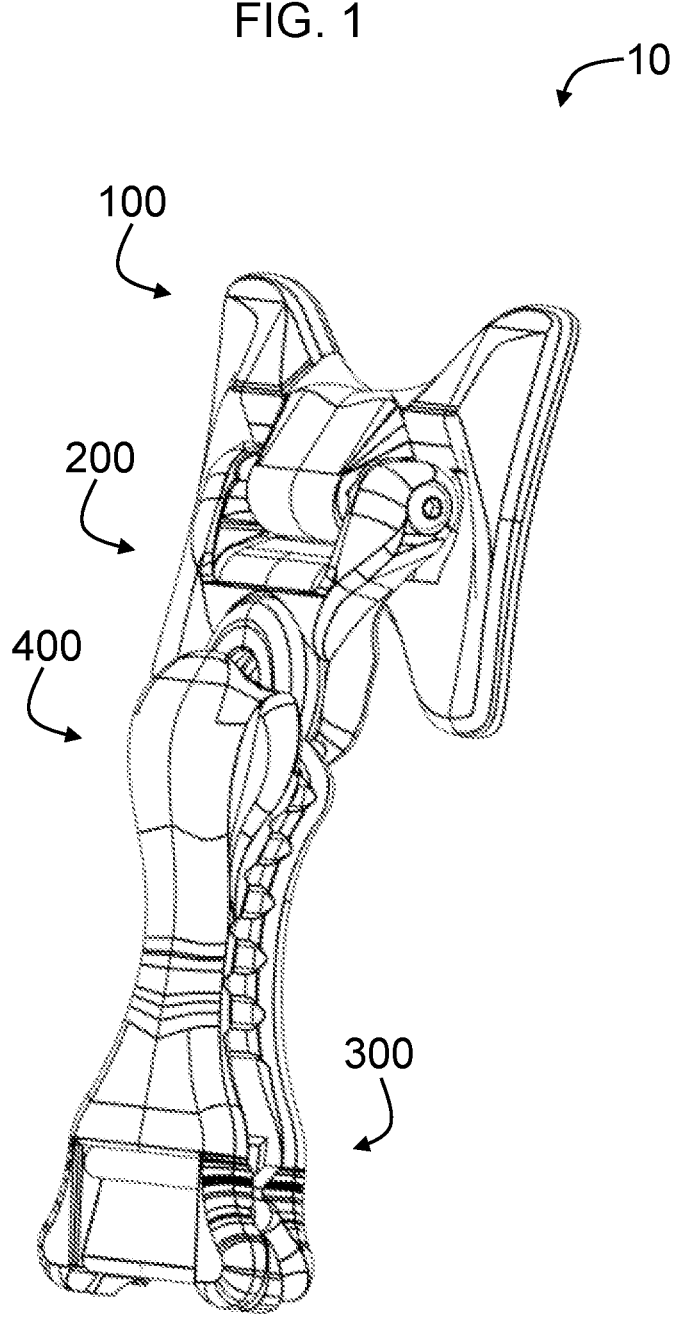
FIG. 1 shows a schematic view of an electronic device accessory assembly according to exemplary embodiments hereof.

For the purposes of this specification, the accessory assembly 10, as shown in FIG. 1, will be described predominantly with respect to its use with a mobile device such as a smartphone. However, it is understood that the assembly 10 may be used with any type of device that may benefit from its functionalities and that the scope of the assembly 10 is not limited in any way by the type of device that it may be used with. In addition, as used herein, the term "mobile device" will include a mobile device as well as a mobile device enclosed within a device cover (e.g., a phone case).

In one exemplary embodiment hereof, as shown in FIG. 1, the accessory assembly 10 includes an attachment assembly 100, a pivot assembly 200, a stand assembly 300, and a clip assembly 400. The attachment assembly 100 is attached to a surface of a mobile device D (e.g., the back surface of a mobile phone) as shown in FIG. 3A and FIG. 3B, the stand assembly 200 is coupled to the attachment assembly 100 via the pivot assembly 200 to provide an adjustable stand for the device D, and the clip assembly 300 enables the device D to be removably secured to other structures. The accessory assembly 10 also may include other elements and/or components as necessary to perform its functionalities.

Figure 2:
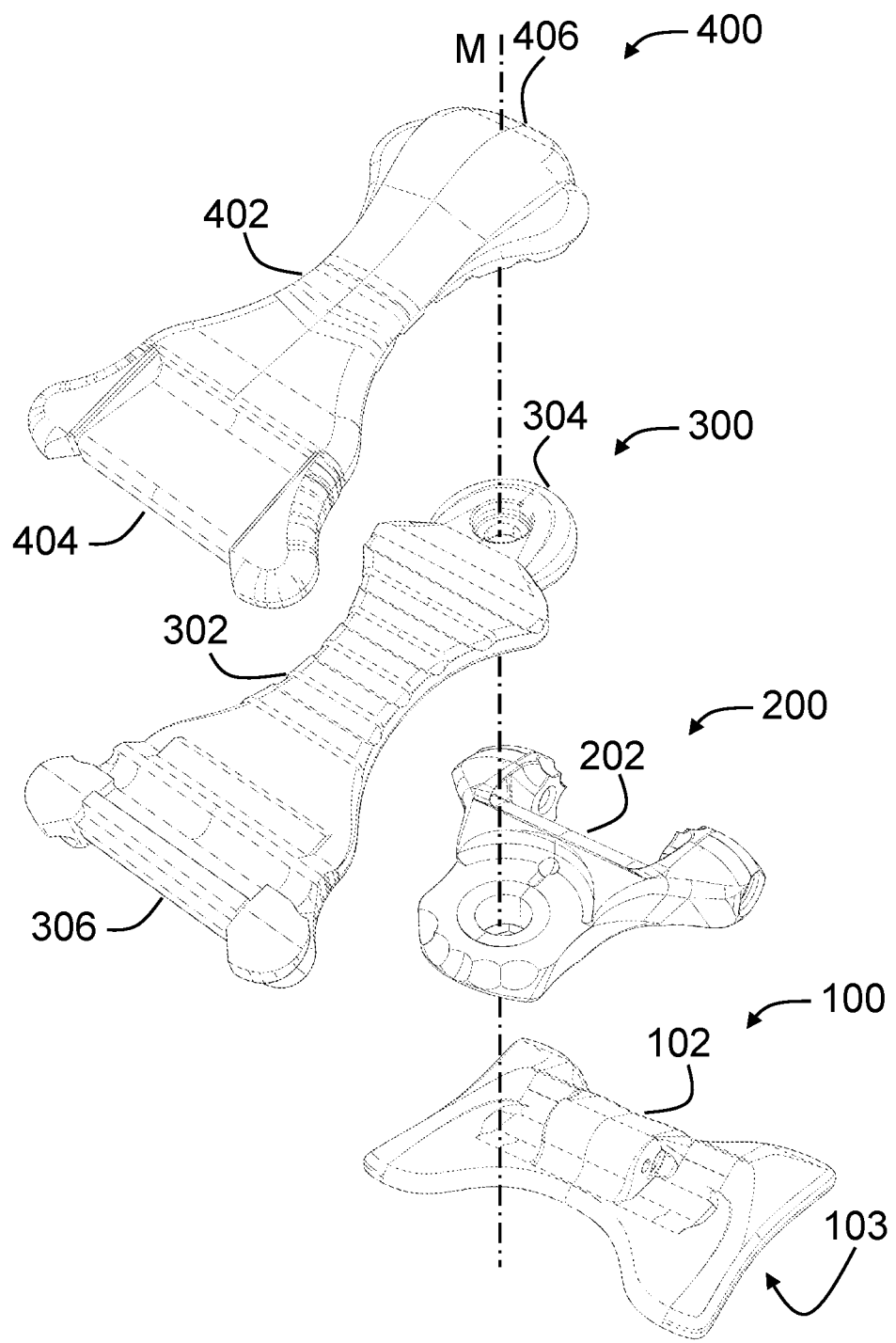
FIG. 2 shows an exploded view of an electronic device accessory according to exemplary embodiments hereof.

FIG. 2 depicts an exploded view of the accessory assembly 10 including the attachment assembly 100, the pivot assembly 200, the stand assembly 300, and the clip assembly 400 aligned along a common axis M. As shown, the attachment assembly 100 includes an attachment base 102 with an underside attachment surface 103 adapted to be attached to a mobile device D, such as that shown in FIGS. 3A-3B, the pivot assembly 200 includes a pivot base 202, the stand assembly 300 includes an elongate stand member 302 with a proximal end 304 and a distal end 306, and the clip assembly 400 includes an elongate clip member 402 with a proximal end 404 and a distal end 406.

For reference, FIGS. 3A-3B depict the assembly 10 attached to a back surface of a mobile device D (or mobile device cover) in a preferred general location and orientation. However, it is understood that the assembly 10 may be attached to a device D in any suitable location and orientation as desired. As shown, the attachment assembly's attachment surface 103 is attached to a back surface of the mobile device D. The pivot base 202 links the attachment base 102 to the proximal end 304 of the elongate stand member 302 which extends downward. The distal end 306 of the elongate stand member 302 is coupled to the proximal end 404 of the elongate clip member 402 which extends upward. The arrangement of these elements will be further described in detail in other sections.

In some embodiments, the attachment surface 103 of the attachment assembly 100 is preferably at least partially flat (and preferably mostly or entirely flat) such that it may rest flush on the device D. In some embodiments, the attachment assembly 100 may be attached to a preexisting device D or device cover as a stand-alone accessory while in other embodiments, the attachment assembly 100 may be integrally formed with the rear surface of the device D and/or device cover during manufacturing. The attachment surface 103 may be secured to the surface of the device D or cover using adhesive, double-sided tape, hook and loop material, screws, welding, and/or other types of attachment mechanisms.

Figure 4:
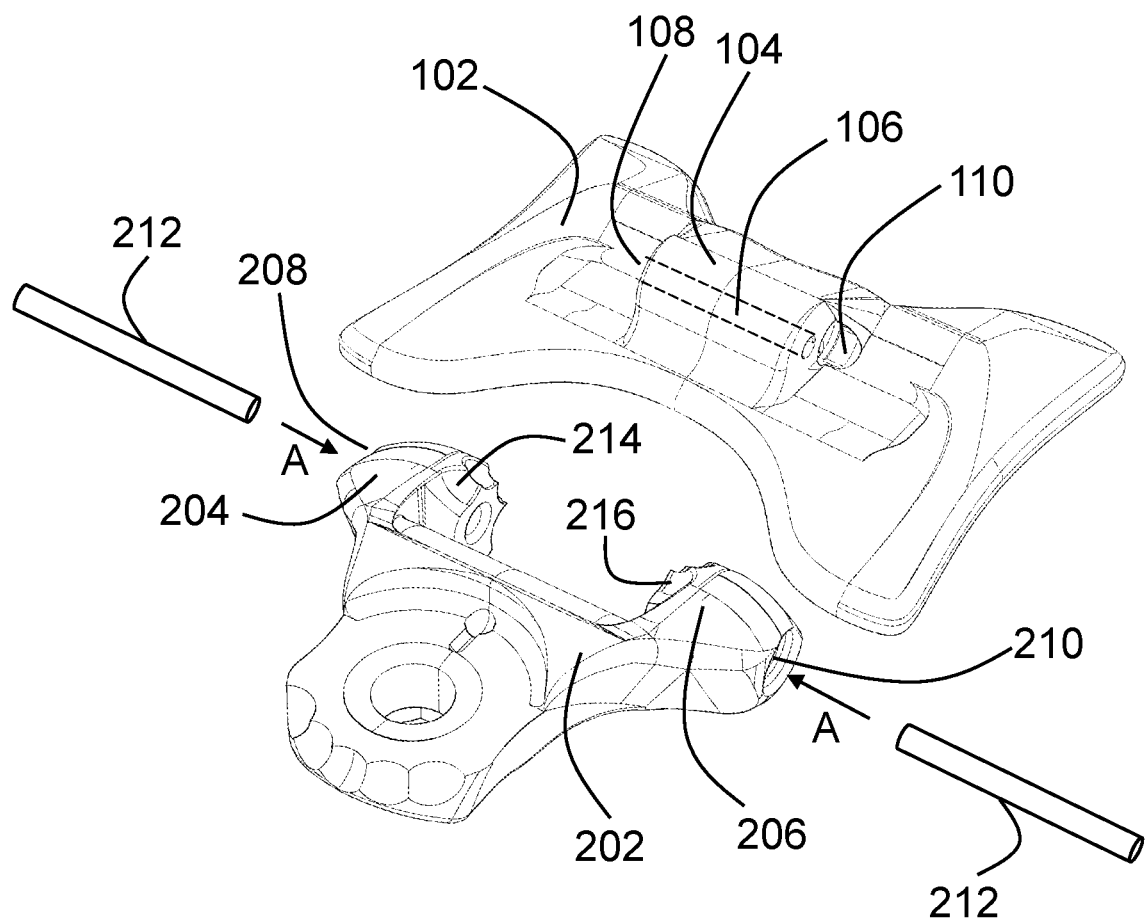
FIG. 4 shows a schematic side of an attachment base and a pivot base according to exemplary embodiments hereof.
Figure 6:
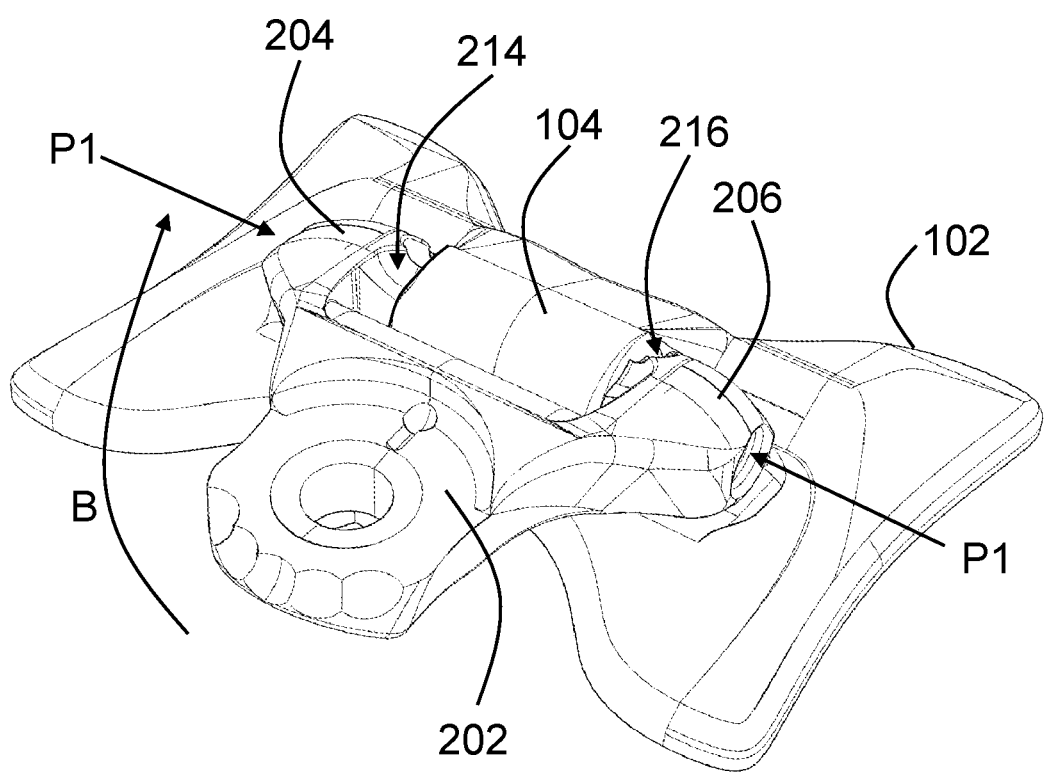
FIG. 6 shows a pivot base coupled with an attachment base according to exemplary embodiments hereof.

In some embodiments as shown in FIG. 4, the attachment assembly base 102 includes a mount 104 with a peg hole 106 passing from its left to its right. In addition, the pivot assembly base 202 includes a left arm 204 including a peg hole 208 and a right arm 206 including a peg hole 210. The left and right arms 204, 206 are adapted to straddle the attachment assembly mount 104 such that the peg holes 208, 210 of the pivot base 202 align with the peg hole 106 of the attachment mount 104. Pegs 212 are then inserted through the peg holes 208, 210 of the arms 204, 206, respectively (as depicted by the arrows A) with a portion of each peg 212 extending into the attachment mount 104's peg hole 106 from either end. A single peg 212 extending through the peg holes 208, 106, 210 also may be used. In this configuration, the peg(s) 212 and the aligned peg holes 208, 106, 210 provide a pivot point P1 as shown in FIG. 6 about which the pivot assembly 200 may rotate with respect to the attachment assembly 100. The result of this configuration is shown in FIG. 6 with the direction of rotation represented by the arrow B.

Figure 5:
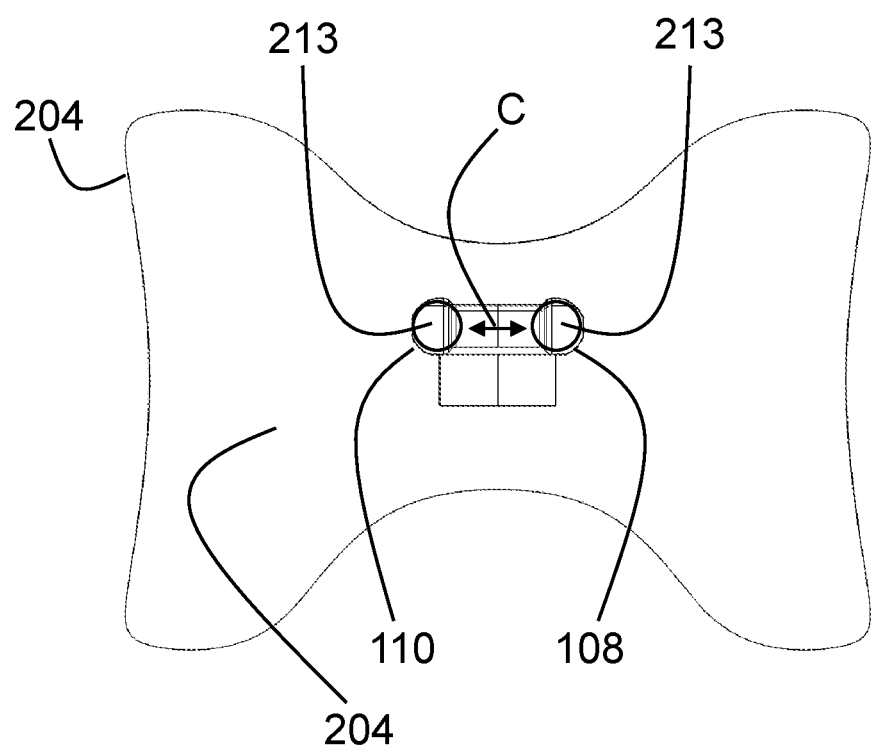
FIG. 5 shows an underside view of an attachment base according to exemplary embodiments hereof.

In some embodiments as shown in FIGS. 4 and 5 (with FIG. 5 showing the attachment base of FIG. 4 flipped over to show its underneath side), the attachment base 102 includes a left ball bearing cavity 108 on the left side of its mount 104 and a right ball bearing cavity 110 on the right side of its mount 104. Each ball bearing cavity 108, 110 is adapted to hold a ball bearing 213 secure with an outer portion of each ball bearing 213 exposed on the topside of the attachment base 102 adjacent the mount 104. In some embodiments, the ball bearings 213 are spring loaded outwardly by a spring from within the attachment base 102 causing an outward bias in the directions of arrow C to each bearing 213 (e.g., as shown in FIG. 5). The bearings 213 may be inserted into the bearing cavities 110 from the underside of the attachment base 102 and sealed using a closure insert.

In addition, the pivot base left arm 204 includes a series of left detents 214, as shown in FIG. 6, concentrically positioned about its peg hole 208 on the inner side of the arm 204 and adapted to engage the left ball bearing 213, and the pivot base right arm 206 includes a series of right detents 216 concentrically positioned about its peg hole 210 on the inner side of the arm 206 and adapted to engage the right ball bearing 213. While four left detents 214 and four right detents 216 are contemplated in FIG. 4, it is understood that any number of left and right detents 214, 216 may be used.

Figure 7:
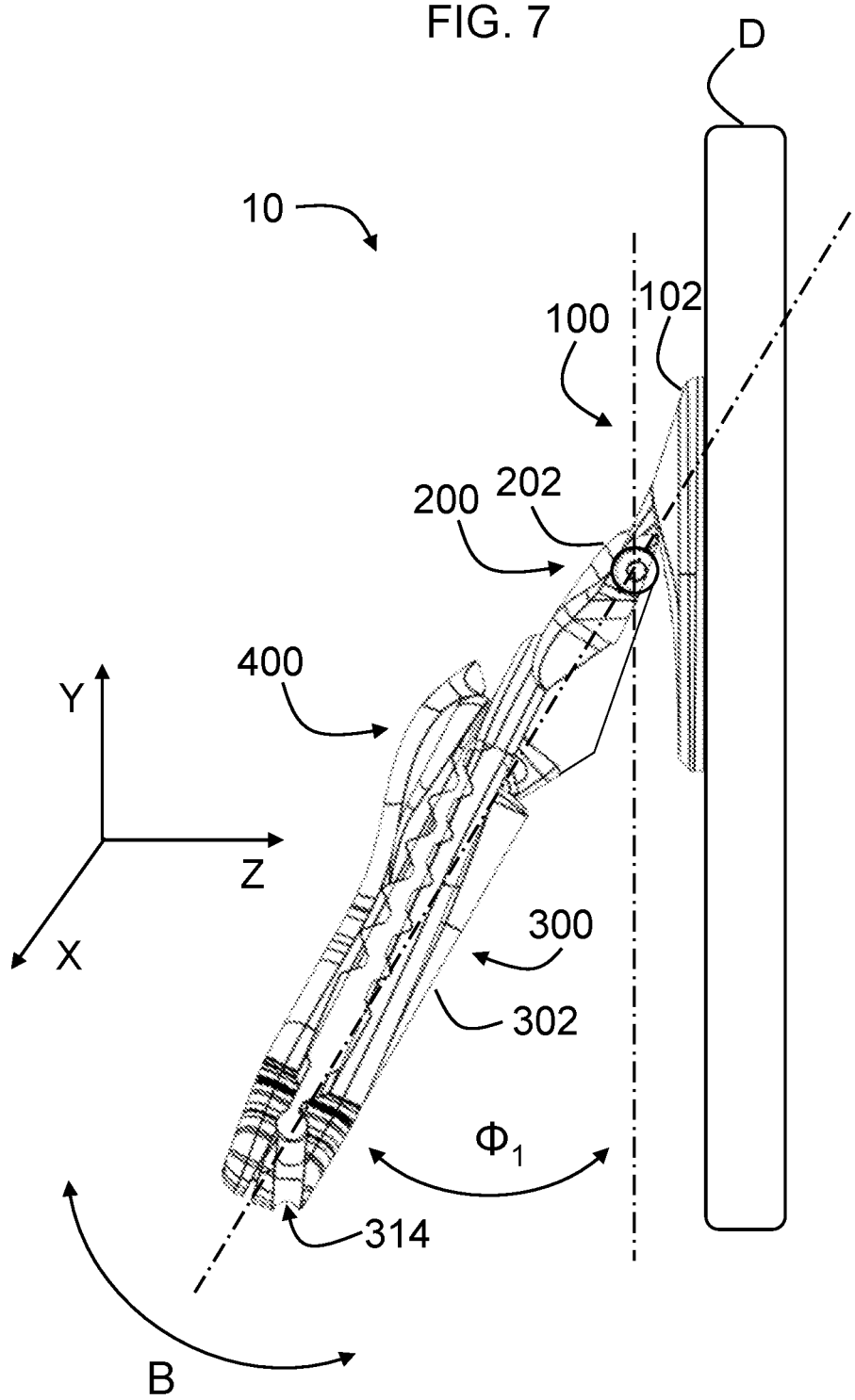
FIG. 7 shows an electronic device accessory assembly configured with a mobile device according to exemplary embodiments hereof.

As shown in FIG. 7, with the pivot base 202 configured with the attachment mount 104 as described above, the ball bearing-detent combinations 213-214, 213-216 releasably hold the pivot assembly 200 (and the stand member 202) at preset angles $\Phi_1$ of rotation with respect to the attachment assembly 100 depending on the number, locations and spacings of the detents 214, 216. In this way, with the accessory assembly 10 attached to a mobile device D (see FIG. 3), the stand assembly 200 may be extended at varying angles $\Phi_1$ to hold the device D upright at corresponding viewing angles. In some embodiments, the preset angles $\Phi_1$ of rotation include −5°, 45°, 90°, and 135°. However, it is understood that the preset angles $\Phi_1$ of rotation may be set to include any desired angles by adjusting the number, positions, and spacing of the detents 214, 216 as shown in FIG. 6.

Figure 8:
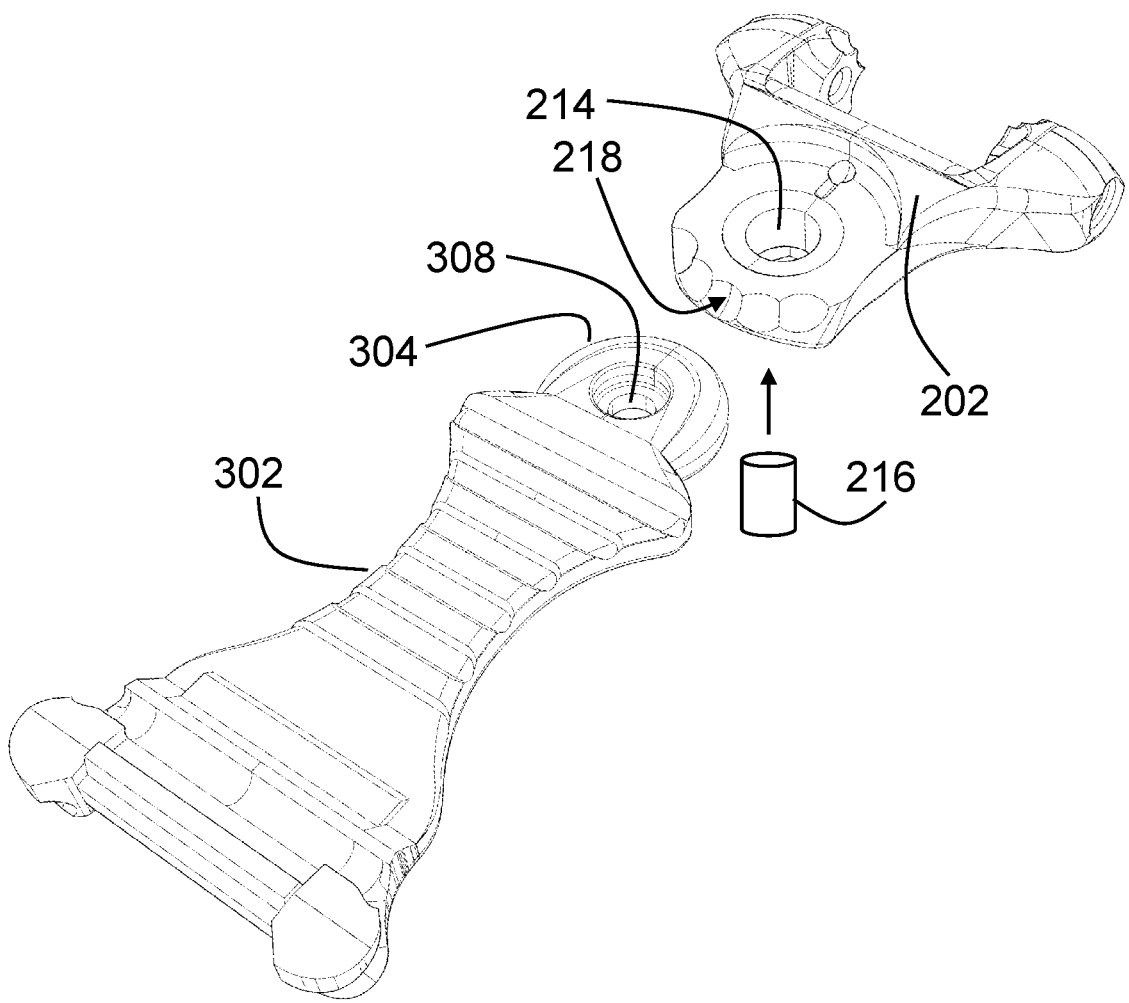
FIG. 8 shows a pivot base and a stand member according to exemplary embodiments hereof.
Figure 9:
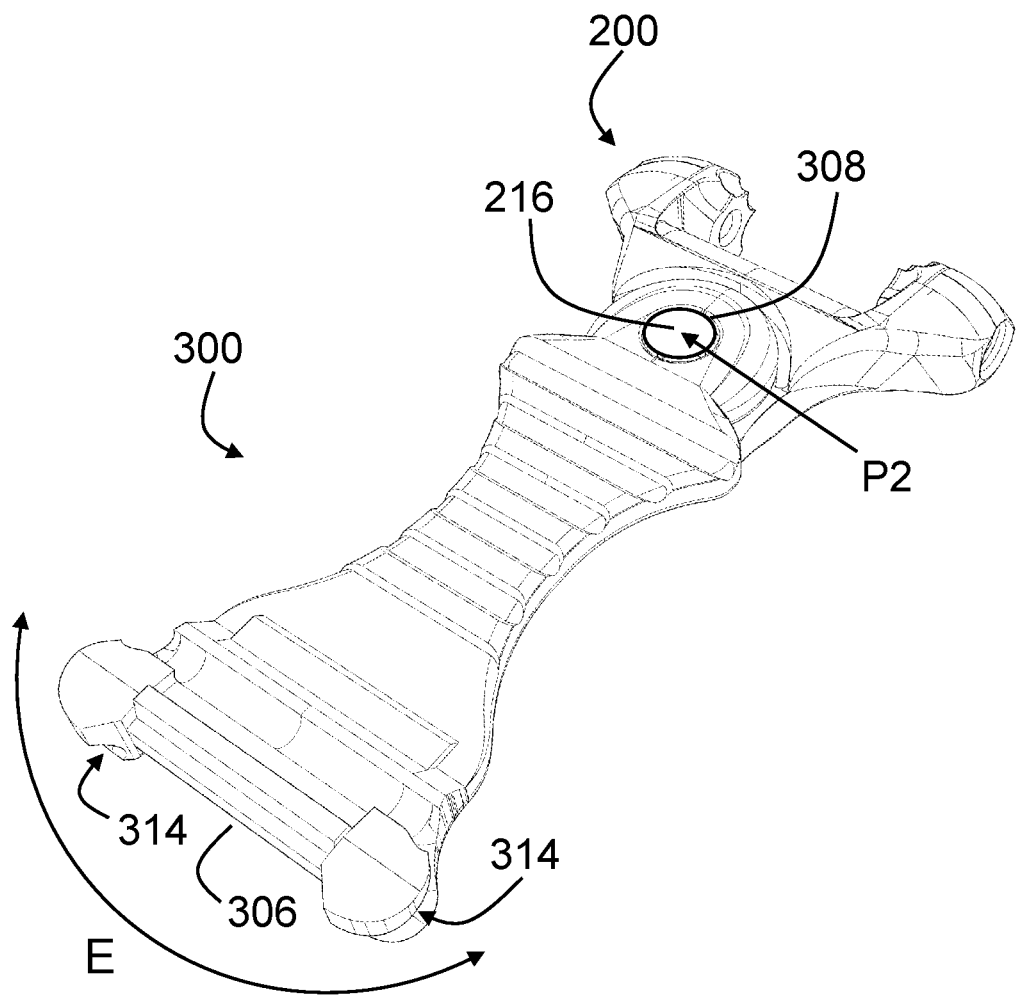
FIG. 9 shows a pivot base coupled with a stand member according to exemplary embodiments hereof.

In some embodiments as shown in FIG. 8, the elongate stand member 302 includes a peg hole 308 passing through its proximal end 304 from its topside to its underneath side, and the pivot base 202 includes a peg hole 214 passing from its topside to its underneath side. The stand member 302 and the pivot base 202 may be coupled by aligning the peg holes 308, 214 and inserting a peg 216 through the hole combination to hold the elements secure. In this way, the peg 216 and the aligned peg holes 308, 214 provide a pivot point P2 about which the stand assembly 300 may rotate with respect to the pivot assembly 200. The result of this configuration is shown in FIG. 9 with the direction of rotation represented by the arrow E.

In some embodiments as shown in FIG. 8, the pivot base 202 includes a series of detents 218 on its lower portion facing away from the peg hole 214 and towards the elongate stand member 302. While five detents 218 are contemplated in FIG. 8, it is understood that any number of detents 218 may be used. As will be described in other sections, the detents 218 may comprise spring loaded ball bearings held within corresponding recesses. However, it is understood that other types of detents 218 also may be used such as, without limitation, rods held within recesses or by notches, tabs held within notches or by ridges, opposing ridges, spring loaded devices, other types of detents and any combinations thereof.

Figure 10:
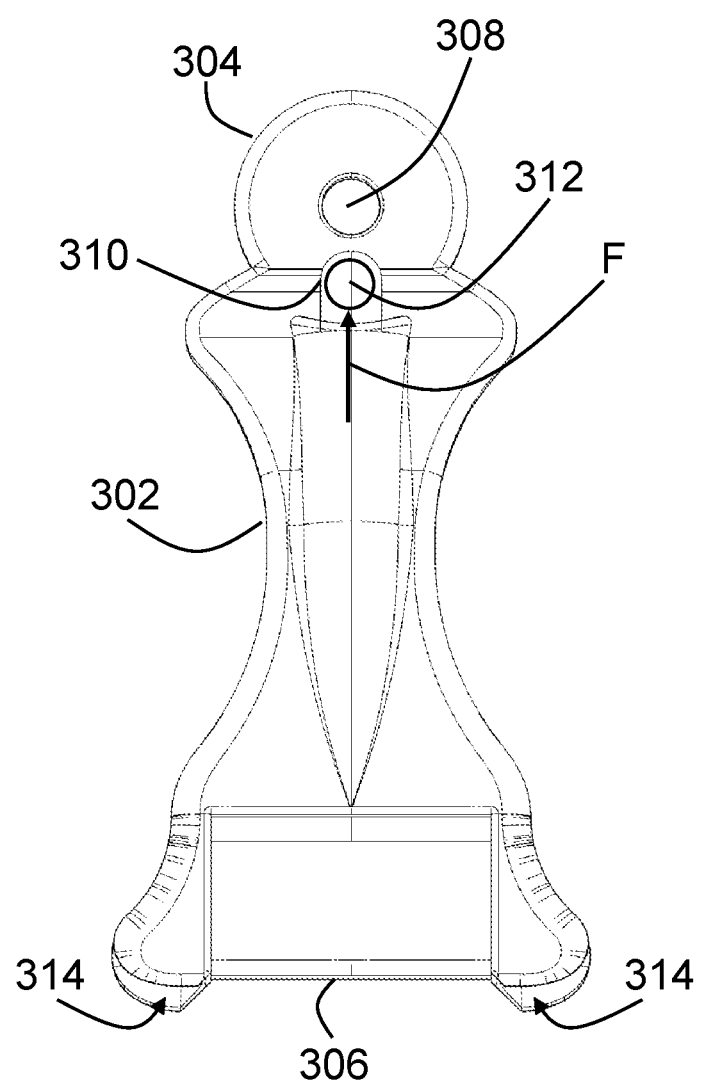
FIG. 10 shows an underside view of a stand member according to exemplary embodiments hereof.
Figure 11:
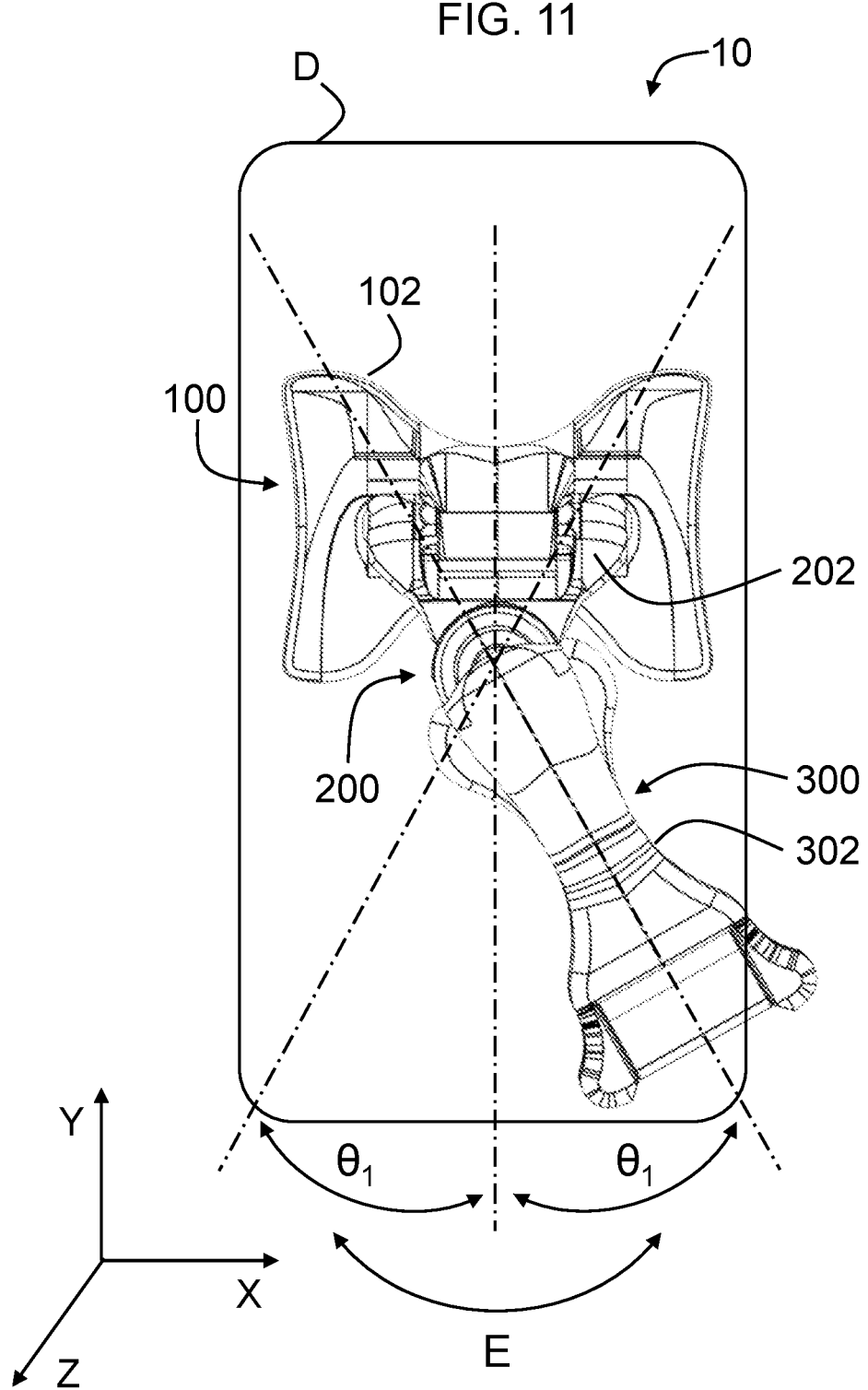
FIG. 11 shows an electronic device accessory assembly configured with a mobile device according to exemplary embodiments hereof.

In addition, as shown in FIG. 10 (depicting the stand member 302 of FIG. 7 flipped over to show its underneath side) the elongate stand member 302 includes a ball bearing placement position 310 (e.g., a cavity) on its underside adapted to hold a ball bearing 312. In some embodiments, the ball bearing 312 is spring loaded by a spring from within the stand member 302 causing an upward bias to the bearing 312 in the direction of arrow F. In this way, with the pivot base 202 and the stand member 302 configured as described above with reference to FIG. 9, the ball bearing 312 may engage a detent 218 and thereby releasably hold the stand assembly 300 at preset angles $\theta_1$ of rotation with respect to the pivot assembly 200 depending on the number, locations and spacings of the detents 218 as shown in FIG. 11.

In some embodiments, the preset angles $\theta_1$ of rotation include 0° (centered), 22.5° to the left of center, 45° to the left of center, 22.5° to the right of center, and 45° to the right of center. However, it is understood that the preset angles $\theta_1$ of rotation may be set to include any desired angles by adjusting the number, positions, and spacing of the detents 218 as shown in FIG. 8.

In some embodiments as shown in FIGS. 7, 9, and 10, the distal end 306 of the stand member 302 includes an O-ring channel 314 adapted to receive an O-ring (e.g., a 3 mm silicon O-ring) that may provide traction between the end 306 and the surface upon which the end 306 engages regardless of its angle $\theta_1$ of rotation.

As described above, the pivot assembly 200 provides the stand assembly 300 with two degrees of freedom: (i) a first degree of freedom in the Z-axis plane as shown in FIG. 7, and (ii) a second degree of freedom in the X-axis plane as shown in FIG. 11.

Figure 12:
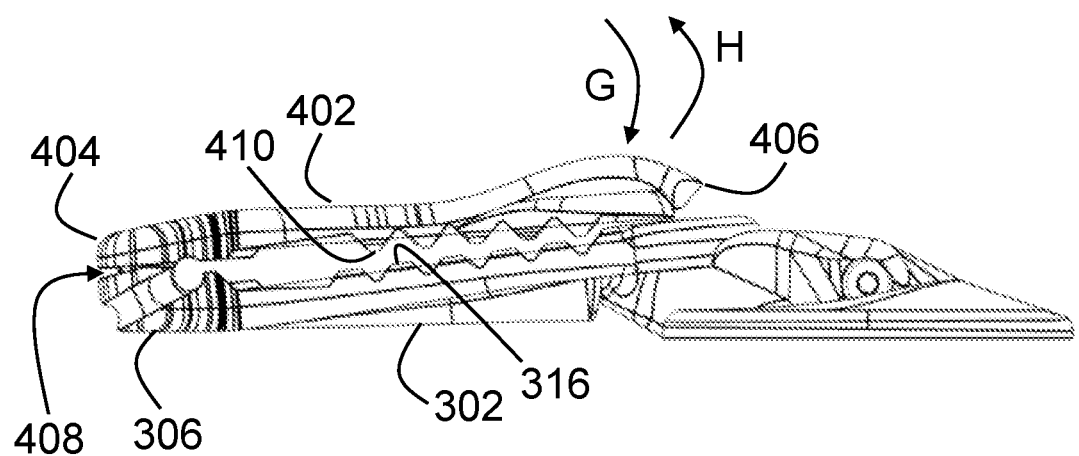
FIG. 12 shows a side view of an electronic device accessory assembly according to exemplary embodiments hereof.

In some embodiments as shown in FIG. 12, the proximal end 404 of the clip member 402 is coupled to the distal end 306 of the stand member 302 using a spring member 408 adapted to apply a bias to the clip member 402 in the direction of arrow G. In this way, the clip member 402 may be rotated upward and away from the stand member 302 in the direction represented by the arrow H and return to its original position by the bias when released.

In some embodiments, the spring mechanism 408 may include a 19 mm (0.75 inch) standard binder clip spring, however, other spring members 408 also may be used. A recess may be provided in the stand member's distal end 306 and in the clip member's proximal end 404 to receive the spring member 408 such that it does not protrude from the outer surfaces of the stand or clip members 302, 402. In some embodiments, the spring member 408 is configured to slip off of the clip member 402 and/or the stand member 302 if the clip member 402 is rotated in the direction H past a predefined position. In this way, the clip member 402 may simply dislodge from the stand and clip members 302, 402 prior to breaking. In some embodiments, the distance of rotation that may cause the clip member 402 to dislodge is about 2.0 inches to 3.0 inches.

In some embodiments as shown in FIG. 12, the underneath side of the clip member 402 and the topside of the stand member 302 include opposing teeth members 410, 316, respectively. The teeth members 410, 316 may facilitate the engagement of the clip member 402 with another structure such as the outer lining of a pants pocket.

In one example of use, the distal end of the clip member 402 functions to slide over the edge of a pocket allowing the accessory assembly 10 and the attached mobile phone D to be held in place within a pocket when not in use. Likewise, with the clip member 402 exposed on the outside of the pocket, a mobile phone D may be readily and conveniently retrieved from the pocket by grasping the exposed clip member 402.

In some embodiments, the accessory assembly 10 comprises durable material, including but not limited to, plastics (e.g., Polycarbonate, ABS, poly-vinyl chloride, nylon, etc.), metal (e.g., aluminum, steel, iron, etc.), composite materials, other types of suitable materials, and any combinations thereof. The assembly 10 may be any color or combination of colors, including embodiments where the different components/portions of the assembly 10 include different colors.

In some embodiments, the accessory assembly 10 may be referred to as a "phone trunk". The term "phone trunk" is derived in part from the shape of the presently disclosed device, which when folded down is reminiscent of the shape of an elephant's head and trunk. However, it is understood that the accessory assembly 10 is not limited to such a shape and that any suitable shape(s) may be used.

It is understood that any aspect and/or element of any embodiment of the system 10 described herein or otherwise may be combined in any way to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A mobile device accessory assembly, comprising:
    a pivot base including a first arm and a second arm defining a gap therebetween, a first set of detents configured with the first arm, a second set of detents configured with the second arm, and a third set of detents configured opposite the first and second arms, the first and second sets of detents opposing one another within the gap;
    an attachment base including a mount rotatably coupled to the pivot base within the gap, the attachment base including a first ball bearing adapted to engage at least one detent of the first set of detents, and a second ball bearing adapted to engage at least one detent of the second set of detents;
    a stand member with a proximal end and a distal end, the distal end rotatably coupled to the pivot base and including a third ball bearing adapted to engage at least one detent of the third set of detents; and
    a clip member with a proximal end and a distal end, the proximal end coupled with the distal end of the stand member;
    wherein the attachment base is adapted to rotate with respect to the pivot base in a first direction, and the stand member is adapted to rotate with respect to the pivot base in a second direction distinct from the first direction.

2. The mobile device accessory assembly of claim 1 wherein the attachment base includes an attachment surface adapted to be connected to a surface of a mobile device.

3. The mobile device accessory assembly of claim 1 wherein the first direction is along a first axis and the second direction is along a second axis, the first and second axis perpendicular with one another.

4. The mobile device accessory assembly of claim 1 wherein the engagement of the first ball bearing with at least one detent of the first set of detents and the engagement of the second ball bearing with at least one detent of the second set of detents releasably holds the attachment base at a first angle with respect to the pivot base.

5. The mobile device accessory assembly of claim 4, wherein the first angle is selected from the group of −5°, 45°, 90°, and 135°.

6. The mobile device accessory assembly of claim 1, wherein the engagement of the third ball bearing with at least one detent of the third set of detents releasably holds the stand member at a second angle with respect to the pivot base.

7. The mobile device accessory assembly of claim 6, wherein the second angle is selected from the group of 0°, 22.5° to the left of 0°, 45° to the left of 0°, 22.5° to the right of 0°, and 45° to the right of 0°.

8. The mobile device accessory assembly of claim 1, wherein the first arm includes a first peg hole, the second arm includes a second peg hole, and the mount includes a third peg hole, and wherein the first, second and third peg holes are aligned to form a pivot point about which the attachment base rotates with respect to the pivot base.

9. The mobile device accessory assembly of claim 1, wherein the distal end of the stand member includes a first peg hole, and the pivot base includes a second peg hole, and wherein the first and second peg holes are aligned to form a pivot point about which the stand member rotates with respect to the pivot base.

10. The mobile device accessory assembly of claim 1 wherein the proximal end of the clip member is coupled to the distal end of the stand member with a spring member.

11. The mobile device accessory assembly of claim 1, wherein the first ball bearing and the second ball bearing are each spring loaded from within the attachment base.

12. The mobile device accessory assembly of claim 1, wherein the third ball bearing is spring loaded from within the stand member.

13. The mobile device accessory assembly of claim 1, further comprising an O-ring channel configured with the distal end of the stand member and adapted to hold an O-ring, at least a portion of the O-ring exposed to provide traction between the distal end of the stand member and a surface upon which the stand member engages.

14. A mobile device accessory assembly, comprising:
    a pivot base including a first coupling peg and a second coupling peg, a first set of detents concentrically positioned about the first coupling peg, and a second set of detents concentrically positioned about the second coupling peg;
    an attachment base including an attachment surface adapted to be connected to a surface of a mobile device, a mount rotatably coupled to the first coupling peg, and a first ball bearing adapted to engage at least one detent of the first set of detents;
    a stand member with a proximal end and a distal end, the proximal end rotatably coupled to the second coupling peg and including a second ball bearing adapted to engage at least one detent of the second set of detents; and a clip member with a proximal end and a distal end, the proximal end coupled with the distal end of the stand member;

wherein the attachment base is adapted to rotate with respect to the pivot base in a first direction, and the stand member is adapted to rotate with respect to the pivot base in a second direction distinct from the first direction.

15. The mobile device accessory assembly of claim 14, wherein the first direction is along a first axis and the second direction is along a second axis, and the first and second axis are perpendicular with one another.

16. The mobile device accessory assembly of claim 14, wherein the engagement of the first ball bearing with at least one detent of the first set of detents releasably holds the attachment base at a first angle with respect to the pivot base.

17. The mobile device accessory assembly of claim 14, wherein the engagement of the second ball bearing with at least one detent of the second set of detents releasably holds the stand member at a second angle with respect to the pivot base.

18. The mobile device accessory assembly of claim 14, wherein the first coupling peg is perpendicular to the second coupling peg.

19. The mobile device accessory assembly of claim 14, wherein the pivot base includes a third coupling peg and a third set of detents concentrically positioned about the third coupling peg, and the attachment base includes a third ball bearing adapted to engage at least one detent of the third set of detents.

20. The mobile device accessory assembly of claim 14, wherein the first ball bearing is spring loaded from within the attachment base and the second ball bearing is spring loaded from within the stand member.

* * * * *